United States Patent
Kretschmer

[11] 3,771,834
[45] Nov. 13, 1973

[54] FASTENING ARRANGEMENT FOR DECORATIVE WHEEL RINGS

[76] Inventor: Paul Kretschmer, 8752 Hohenstr. 18, Waldaschaff, Germany

[22] Filed: July 3, 1972

[21] Appl. No.: 268,668

[52] U.S. Cl. .............................................. 301/37 P
[51] Int. Cl. ............................................ B60b 7/06
[58] Field of Search .............. 24/73 R, 73 B, 73 SC, 24/73 HC; 301/37 P, 37 CD, 37 R, 108 R

[56] References Cited
UNITED STATES PATENTS

| | | | |
|---|---|---|---|
| 2,088,109 | 7/1937 | Horn | 301/37 CD |
| 2,174,087 | 9/1939 | Horn | 301/37 CD |
| 3,043,632 | 7/1962 | Wagner | 301/37 R |
| 3,060,535 | 10/1962 | Munse | 24/73 B |

FOREIGN PATENTS OR APPLICATIONS
1,209,798  10/1970  Great Britain .................... 301/37 P Primary Examiner—Richard J. Johnson
Attorney—J. King Harness et al.

[57] ABSTRACT

A plurality of axial clip-receiving recesses are provided on an axial flange of a decorative wheel ring. A clip for fastening the ring to a vehicle wheel is axially interlocked in each recess.

6 Claims, 2 Drawing Figures

PATENTED NOV 13 1973 3,771,834

FASTENING ARRANGEMENT FOR DECORATIVE WHEEL RINGS

This invention relates to a fastening arrangement for securing a decorative wheel ring on a vehicle wheel.

Heretofore, in one type of fastening arrangement, fastening clips have been inserted within axial recesses on an axial flange of the decorative ring.

An object of the present invention is to improve this type of fastening arrangement by making it easier to manufacture while at the same time facilitating installation on a vehicle wheel. Another object is to provide a simpler clip, a simpler assembly and an improved retention of the clip on the decorative wheel ring. A further object is to provide a fastening arrangement wherein the decorative ring can be readily applied to the vehicle wheel and when once applied, is securely retained on the wheel.

According to the disclosure, paired radial straps are provided at intervals along an annular axial flange of the decorative wheel ring, with each pair of straps joined by a bridge spaced radially of the annular flange and a cross-piece at the axially outer end of each pair of straps spaced from the bridge. A fastening clip is held in place between the straps, the bridge, and the cross-piece. A bead on the clip interlocks the clip between the cross-piece and the bridge and an outer end region of the clip adjacent the bead resiliently bears against the axial flange to urge a central region of the clip against the bridge. The clip protrudes through the open axially inner end of the recess and terminates in a spring leg directed generally radially outwardly for biting engagement with an axial wheel flange when the ring is applied to the wheel. The spring leg is connected by means of a curved bend to the central region of the clip to provide softer spring action during flexing.

The accompanying drawings illustrate a preferred embodiment of the invention.

Figure 1:
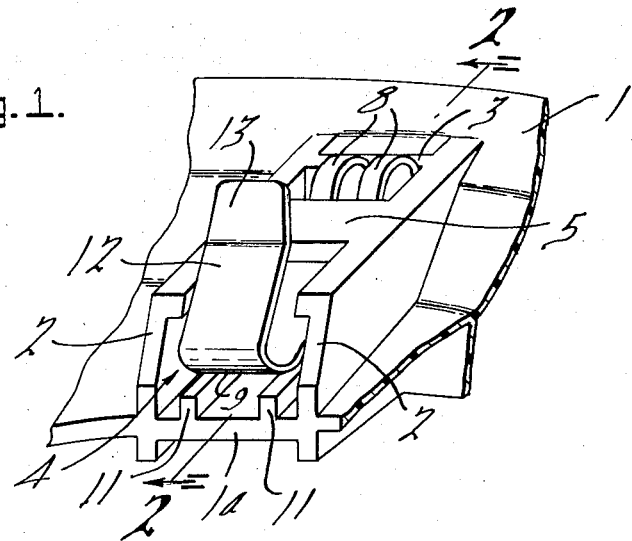
FIG. 1 is a fragmentary perspective view of a decorative ring embodying the fastening arrangement of the invention.
Figure 2:
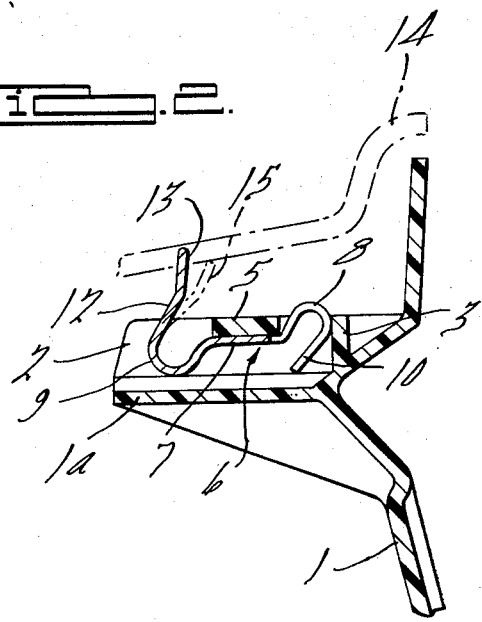
FIG. 2 is a vertical sectional view taken along line 2—2 in FIG. 1.

In the drawings, a plastic decorative ring 1 is provided with an axial flange 1a. (It will be appreciated that ring 1 may either partially or fully cover the vehicle wheel to which it is applied and may be either circular or annular in shape.) A plurality of clip receiving recesses 4 are provided on the radially outer surface of flange 1a at intervals around ring 1. Each recess 4 is defined by a pair of circumferentially spaced straps, or side walls, 2 which project radially and axially of flange 1a. The axially outer end of each recess 4 is defined by a cross-piece, or end wall,3. A bridge, or top wall, 5 bridges side walls 2 in axially inwardly spaced relation to end wall 3 and in radially outwardly spaced relation to flange 1a. A pair of axial striPs, or ribs, 11 are fashioned on flange 1a within recess 4 and are spaced inwardly of side walls 2.

A fastening clip 6 is inserted within each recess 4. Clip 6 comprises a flat central portion 7 and a pair of circumferentially spaced curved beads 8 at the axially outer end of portion 7. Beads 8 are fashioned to protrude through and fit in the space between top wall 5 and end wall 3 to axially interlock clip 6 within recess 4. Beads 8 are looped to re-enter recess 4. End legs 10 project from the re-entrant portion of each bead 8 and engage ribs 11. With clip 6 interlocked with recess 4, legs 10 are sprung on beads 8 to resiliently urge clip portion 7 against top wall 5 and in turn force beads 8 into the space between top wall 5 and end wall 3. Thus, each clip 6 is forcibly retained and axially interlocked on ring 1.

The axially inner end of clip 6 comprises a curved bend 9 at the inner end of portion 7 which curves radially and axially inwardly onto ribs 11 and thence, outwardly into a spring leg 12. Spring leg 12, which may include a bend 13, is directed generally radially outwardly when in its free state. As ring 1 is increasingly applied to a vehicle wheel 14, spring leg 12 is increasingly deflected by the axial wheel flange; when ring 1 is fully applied, spring leg 12 assumes the position indicated at 15 to bitingly engage the axial wheel flange thereby securely retaining ring 1 on wheel 14. The arrangement of bend 9 and spring 12 permits ring 1 to be applied to wheel 14 with minimum effort yet, at the same time provides a sufficient retention force to hold ring 1 securely on wheel 14.

It will be observed that since clip 6 is axially interlocked within recess 4, it will not move axially outwardly relative to flange 1a when ring 1 is applied to wheel 14. Thus, spring leg 12 will be accurately positioned relative to wheel 14 when ring 1 is fully applied to the wheel and proper engagement with the axial wheel flange is always assured. Likewise, when ring 1 is removed, clip 6 can not be pulled out of its recess and hence, is always removed along with ring 1.

While it will be apparent that the invention herein disclosed is well calculated to achieve the benefits and advantages as hereinabove set forth, it will be appreciated that the invention is susceptible to modification, variation and change without departing from the spirit thereof.

I claim:

1. Fastening means for fastening a decorative wheel ring on the axially outer face of a vehicle wheel having an annular axial wheel flange, said fastening means comprising axial flange means on said ring adapted to lie radially inwardly of the axial wheel flange when the ring is applied to the wheel, means defining a plurality of clip-receiving recesses on said flange means around said ring, each of said recesses being defined by end wall means at the axially outer end of each recess and axially extending wall means extending axially inwardly from said end wall means, each recess being open at its axially inner end, said axially extending wall means comprising circumferentially spaced side wall means on said flange means and top wall means extending between said side wall means in radially spaced relation to said flange means, means defining an opening in said axially extending wall means adjacent said end wall means, and a spring clip disposed within each of said recesses, each clip comprising an interlocking portion disposed in said opening for axially interlocking the clip in its recess and a spring leg protruding from the open axially inner end of its recess for engaging the annular axial wheel flange.

2. The fastening means of claim 1 wherein said opening is in said top wall means.

3. The fastening means of claim 2 including resilient means on Said clip for resiliently urging said interlocking portion into said opening.

4. The fastening means of claim 2 wherein said interlocking portion comprises a curved bead.

5. The fastening means of claim 4 wherein said clip includes resilient means engageable with said flange means for resiliently urging said bead into said opening.

6. The fastening means of claim 5 wherein said clip includes a central portion engageable with said top wall means and said resilient means urges said central portion against said top wall means.

* * * * *

UNITED STATES PATENT OFFICE
CERTIFICATE OF CORRECTION

Patent No. 3,771,834　　　　　　　　　Dated November 13, 1973

Inventor(s)　　　　　　Paul Kretschmer

It is certified that error appears in the above-identified patent and that said Letters Patent are hereby corrected as shown below:

Column 1, line 56, "striPs" should be --strips--.
Column 2, line 57, after "opening" insert --and abutting said end wall means--; line 64, "Said" should be --said--.

Signed and sealed this 9th day of April 1974.

(SEAL)
Attest:

EDWARD M. FLETCHER, JR.　　　　　　C. MARSHALL DANN
Attesting Officer　　　　　　　　　　Commissioner of Patents